(12) United States Patent
Theurer et al.

(10) Patent No.: US 7,050,926 B2
(45) Date of Patent: May 23, 2006

(54) METHOD OF SURVEYING A TRACK

(75) Inventors: Josef Theurer, Vienna (AT); Bernhard Lichtberger, Leonding (AT)

(73) Assignee: Franz Plasser Bahnbaumaschinen-Industriegesellschaft m.b.H., Vienna (AT)

( * ) Notice: Subject to any disclaimer, the term of this patent is extended or adjusted under 35 U.S.C. 154(b) by 654 days.

(21) Appl. No.: 09/501,251

(22) Filed: Feb. 10, 2000

(65) Prior Publication Data

US 2003/0097235 A1    May 22, 2003

(30) Foreign Application Priority Data

Feb. 12, 1999    (AT) .................................... 204/99

(51) Int. Cl.
*E01B 35/00*    (2006.01)

(52) U.S. Cl. .................... 702/150; 702/94; 702/158; 702/165; 701/19; 701/205; 701/207; 33/287

(58) Field of Classification Search ................. 73/146; 702/150, 165, 151, 155, 158, 163, 94, 95; 701/19, 201, 205, 207; 342/357.06, 357.08; 33/287; 104/8–10; 246/120, 121, 122 R
See application file for complete search history.

(56) References Cited

U.S. PATENT DOCUMENTS

| | | | | |
|---|---|---|---|---|
| 3,687,081 A | * | 8/1972 | Plasser et al. ................. 104/12 |
| 3,706,284 A | * | 12/1972 | Plasser et al. ................. 104/7.2 |
| 3,821,933 A | * | 7/1974 | Plasser et al. ................. 104/8 |
| 4,812,991 A | * | 3/1989 | Hatch ........................ 701/225 |
| 5,077,557 A | * | 12/1991 | Ingensand ..................... 342/52 |
| 5,157,840 A | * | 10/1992 | Henttinen ..................... 33/287 |
| 5,233,357 A | * | 8/1993 | Ingensand et al. ........... 342/352 |
| 5,301,548 A | * | 4/1994 | Theurer ....................... 73/146 |
| 5,493,499 A | * | 2/1996 | Theurer et al. ............. 364/449 |
| 5,613,442 A | * | 3/1997 | Ahola et al. .................... 104/8 |
| 5,638,078 A | * | 6/1997 | Wichtel ....................... 342/450 |
| 5,825,328 A | * | 10/1998 | Schipper et al. ........ 342/357.03 |
| 6,119,353 A | * | 9/2000 | Gronskov ........................ 33/1 |
| 6,220,170 B1 | * | 4/2001 | Theurer et al. ............... 104/10 |

OTHER PUBLICATIONS www.rand.org/publications/MR/MR614/MR614.appb.pdf, "GPS History, Chronology, and Budgets".*
Publication "Der Eisenbahningenieur" ("The Railway Engineer"), May 1995, pp. 314 to 318.
Publication "Der Eisenbahningenieur" ("The Railway Engineer"), Aug. 1995, pp. 560 to 563.
Article called "GPS-based data collection" in the publication "Railway Age", Dec. 1994, pp. 66 and 67.

* cited by examiner

*Primary Examiner*—Marc S. Hoff
*Assistant Examiner*—Jeffrey R West
(74) *Attorney, Agent, or Firm*—Henry M. Feiereisen

(57) ABSTRACT

In a method of surveying a track (9), a first or mobile measuring vehicle (1) and a second or stationary measuring vehicle (2) are placed at a distance apart from one another on a track section to be measured. A reference line (14) is formed by a laser beam emitted from the stationary measuring vehicle (2). At the start of each measuring cycle, by using a GPS receiver (19), the relative position of the stationary measuring vehicle (2) with reference to a fixedly installed GPS reference station (29) located adjacent to the track section is determined, the said GPS reference station being known within a terrestrial coordinate system. The reference line (14) is aligned with the mobile measuring vehicle (1) on the basis of the determined position data, and the track surveying operation is carried out by advancing the mobile measuring vehicle (1) while changes of the actual track position relative to the reference line (14) are registered.

2 Claims, 1 Drawing Sheet

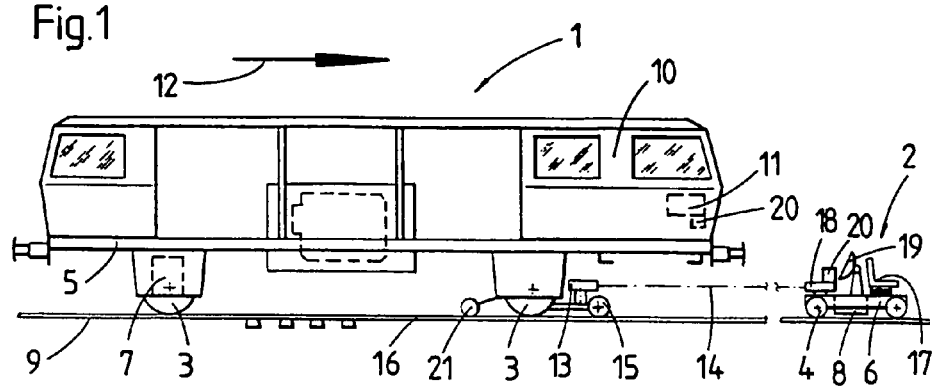
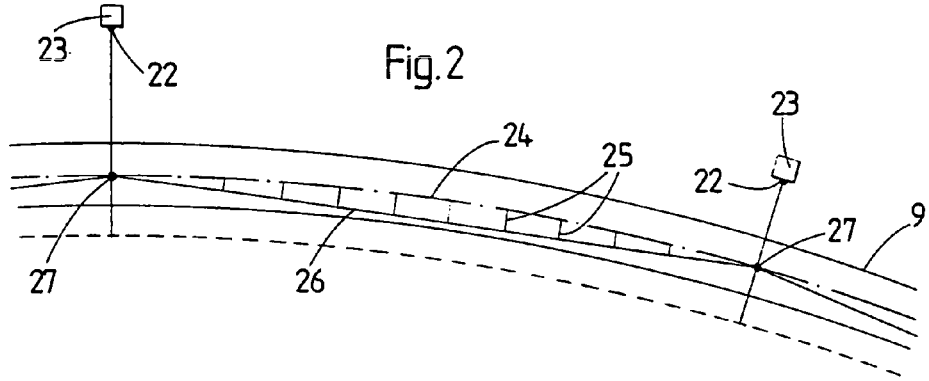
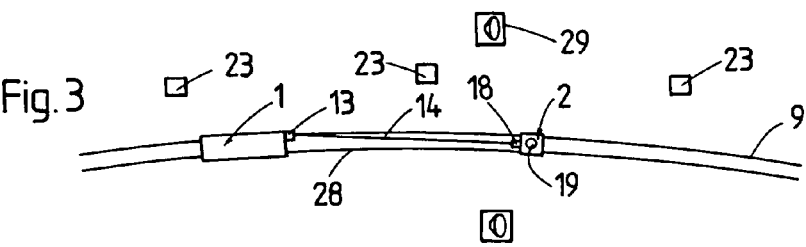
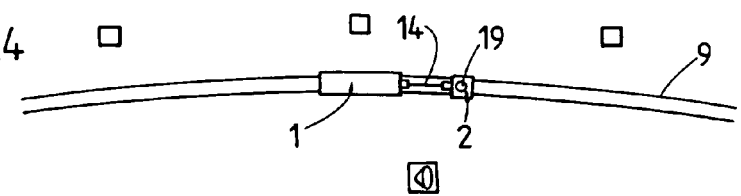
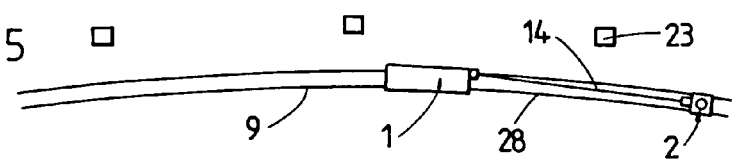

METHOD OF SURVEYING A TRACK

BACKGROUND OF THE INVENTION

The present invention relates, in general, to track survey methods, and more specifically to a method of surveying a track, in which a first and a second measuring vehicle are positioned at end points, respectively, of a track section to be measured during a measuring cycle, the first measuring vehicle being designed for mobility independently of the second measuring vehicle which is stationary during the measuring operation, and the position coordinates of the second measuring vehicle are determined, a reference line in the form of an optical measuring beam is set up between the two measuring vehicles, and the mobile, first measuring vehicle is advanced in the direction towards the stationary, second measuring vehicle while any change in position of a receiving unit, mounted on the first measuring vehicle, relative to the reference line is registered as a correction measurement value.

A method of track surveying with a track pre-measurement car called EM-SAT is described in the publication "Der Eisenbahningenieur" ("The Railway Engineer"), May 1995, pages 314 to 318. The measurement operation is carried out in a cyclical fashion. The measuring vehicle (also called satellite) which is stationary during the surveying operation is first moved along the track in the operating direction until it is close to the next geodetically surveyed reference point, normally located on a catenary mast. A laser beam emitter mounted on the satellite is aligned with regard to said reference point, adjoining in the transverse direction of the track, and thus is brought into an exact desired position. Thereafter, with the aid of a telescope fastened to the laser beam emitter, the latter is aligned with a receiver located on the main machine which constitutes the other, mobile measuring vehicle. During this, the measuring axle of said mobile measuring vehicle is stopped exactly at a reference point which has previously been marked with paint at the rail base. This precise positioning is facilitated by a video camera showing the rail base and the wheel of the measuring axle.

The actual surveying of the track section is initiated by advancing the mobile measuring vehicle, with the position of the laser beam relative to the actual position of the track being measured at intervals of 20 centimeters and stored. With the aid of a special computer program it is possible to calculate from the geometrical data in a track monument plan the desired versines for line and level. To do this, it is merely necessary to input the track geometry and the position of the reference points. These versine values serve for comparison to the measured versines, with the difference thereof producing the correction values for level and line. The surveying of the track section is finished as soon as the mobile measuring vehicle has reached the stationary measuring vehicle. While the stationary measuring vehicle is advanced to the next reference point in order to carry out the succeeding measuring operation, the displacement- and lifting values for the just surveyed track section are computed. The determined correction values may be stored on a floppy disk to be loaded into a tamping machine, for instance, and to be worked off automatically for the accurate correction of the track position.

U.S. Pat. No. 5,493,499 describes a method of surveying a track wherein two measuring units, movable on the track, are placed at both end points of a track section to be measured and their respective positions are defined in relation to a track reference point. Subsequently, one of the two measuring units is moved in steps in the direction towards the other measuring unit, wherein, at every interruption of travel for implementing a measuring procedure, the measurement data of the actual track position are compared with the measurement data of the desired position and a corresponding differential value is calculated and stored. In this, as a result of the reception of a position signal from surveying satellites (Global Positioning System or GPS), the position of the two measuring units relative to one another in a coordinate system is determined. At each stop of the second measuring unit during its measurement travel in the direction towards the opposite, first measuring unit, the respective relative change in position is determined as a result of the reception of a further position signal from surveying satellites.

Additional details regarding the said methods of track surveying are described in the publication "Der Eisenbahningenieur" ("The Railway Engineer"), August 1995, pages 560 to 563.

According to an article called "GPS-based data collection" in the publication "Railway Age", December 1994, pages 66 and 67, it is known to use GPS to determine which track sections require treatment.

Finally, a method and a device for rapidly and accurately determining the position coordinates of a movable receiver relative to a fixedly installed receiver are described in U.S. Pat. No. 4,812,991.

SUMMARY OF THE INVENTION

It is an object of the present invention to provide an improved method of surveying a track, which enables a more rapid work progress while realizing a very high precision of measurement.

This object, and others which will become apparent hereinafter, are attained in accordance with the present invention by a method of surveying a track which comprises the steps of positioning a first and a second measuring vehicle at end points, respectively, of a track section to be measured during a measuring cycle, the first measuring vehicle being designed for mobility independently of the second measuring vehicle which is stationary during the measuring operation, determining, at the start of each measuring cycle, position coordinates of the stationary, second measuring vehicle, with the aid of a GPS receiver mounted thereon, relative to a fixedly installed GPS reference station located adjacent the track section to be measured, the coordinates of the GPS reference station being known within a terrestrial coordinate system, setting up a reference line in the form of an optical measuring beam between an emitter mounted on the second measuring vehicle and a receiving unit mounted on the first measuring vehicle, aligning the reference line with the first measuring vehicle on the basis of the determined position data, advancing the mobile, first measuring vehicle in the direction towards the stationary, second measuring vehicle to carry out the track surveying operation, and registering as a correction measurement value any change in position of the receiving unit mounted on the first measuring vehicle relative to the reference line.

A measuring method of this kind has the particular advantage that the laser beam emitter does not need to be aligned with respect to an adjacent reference point in a time-consuming manner. Furthermore, the also time-consuming task of positioning the two measuring vehicles precisely at the beginning and end, respectively, of the track section to be measured likewise becomes unnecessary in the process. Additionally, the track sections can be surveyed overlappingly, avoiding a closed traverse. Finally, the surveyed position data may also be used in an advantageous manner for creating a track position plan with precisely defined, exact coordinates.

BRIEF DESCRIPTION OF THE DRAWING

The above and other objects, features and advantages of the present invention will be more readily apparent upon reading the following description of a preferred exemplified embodiment of the invention with reference to the accompanying drawing, in which:

FIG. 1 is a side elevational view of two measuring vehicles for surveying a track section in accordance with the present invention;

FIG. 2 is a schematic representation of a desired track position and a reference line formed by a laser beam between the two measuring vehicles; and FIGS. 3 to 5 are greatly simplified representations of different positions of the two measuring vehicles during track surveying operation.

DETAILED DESCRIPTION OF PREFERRED EMBODIMENT

Throughout all the Figures, same or corresponding elements are generally indicated by same reference numerals.

Referring now to the drawing and in particular to FIG. 1, there is shown a primary machine or measuring vehicle 1 and a satellite or secondary measuring vehicle 2. During track surveying operation, the primary machine 1 is movable relative to satellite or secondary measuring vehicle 2 which remains stationary in place. Therefore, the primary machine is designated hereinafter as mobile measuring vehicle 1 while the satellite is designated hereinafter as stationary secondary measuring vehicle 2. The mobile measuring vehicle 1 has a machine frame 5 which is supported by undercarriages 3 and includes a motive drive 7 for mobility along a track 9 in an operating direction. Likewise, the stationary measuring vehicle 2 has a machine frame 6 which is supported by undercarriages 4 and includes a motive drive 8 for mobility, independently from the mobile measuring vehicle 1, along the track 9. Located in a driver's cab 10 of the mobile measuring vehicle 1 is a controlling and computing unit 11. The operating direction of the mobile measuring vehicle 1 during the track surveying operation is indicated by an arrow 12.

The stationary measuring vehicle 2 has a seat 17 for accommodating an operator and is equipped with an emitter 18 in the shape of a diode laser supported on the machine frame 6 for adjustment by means of drives (not shown). A receiving unit 13 is arranged underneath the front end of the mobile measuring vehicle 1, outside of the area defined by the two undercarriages 3. The receiving unit 13 is designed as a high-speed image analyzing system for localizing a reference line 14 which is formed by a laser beam created by the emitter 18. The receiving unit 13 is articulated to one end of the machine frame 5 and supported by flanged rollers 15 on rails 16 of the track 9.

Also arranged on the stationary measuring vehicle 2 for receiving position data in connection with the conventional Global Positioning System (GPS) is a GPS receiver 19. Radio units 20 are provided for transmission of data between the mobile measuring vehicle 1 and stationary measuring vehicle 2 to the controlling and computing unit 11. For distance measuring, an odometer 21 is positioned on the mobile measuring vehicle 1.

In FIG. 2, the definition of the desired position of the track 9 is shown in a simplified way. The coordinates of the track 9 are precisely defined in a track monument plan (not shown) with regard to reference points 22 which are fastened to catenary masts 23. Dash-dotted line 24 indicates the track center. The track position is defined by versines 25 spaced from one another by a distance of five meters. A chord 26, forming the base for the versines 25, is defined by so-called desired points 27 which are located at the desired distance from the reference points 22.

The conventional method of surveying a track by means of an EM-SAT would precisely align the emitter 18 of the stationary measuring vehicle 2 with the desired point 27 in order to form a base for the versines 25 with the aid of the laser beam serving as reference line 14. Such a precise alignment of the emitter 18 requires a measuring team to carry out corresponding measuring operations prior to the track surveying, taking into account the oppositely positioned reference points 22, with the measuring results being written onto the ties, for example. Although, the alignment of the emitter 18 could conceivably also carried out by using a sighting telescope which is secured to the emitter 18; This procedure is however time-consuming and requires precise positioning of the mobile measuring vehicle 1 at the previously surveyed desired point 27.

In the following, the novel and inventive method for surveying a track section 28 will be described in more detail with particular reference to FIGS. 3 to 5.

At the start of the track surveying operation, the stationary measuring vehicle 2 is moved in the region of the track section 28 to be surveyed and stopped as soon as the critical distance, subject to weather conditions, for receiving the laser beam (reference line 14) has been reached. By activation of the GPS receiver 19, position data of the stationary measuring vehicle 2 are received and related to the known position data of a fixedly installed GPS reference station 29 located near the track 9. Since the coordinates of the GPS reference station 29 are accurately known within a terrestrial coordinate system, the position coordinates of the stationary measuring vehicle 2 in the coordinate system can also be accurately determined and transmitted by means of the radio unit 20 to the controlling and computing unit 11. The controlling and computing unit 11 instantly compares the position data with stored desired value data, and considers a possible difference during the following surveying operation.

After the reference line 14 is set up by aligning the laser beam of the emitter 18 with the receiving unit 13, the surveying operation of the track section 28 is initiated by advancing the mobile measuring vehicle 1 in the direction of arrow 12 toward the stationary measuring vehicle 2. During this advance, the position of the reference line 14 relative to the actual track position is measured at intervals of 20 centimeters, with the actual track position being transmitted to the receiving unit 13 by the flanged rollers 15. In conjunction with the distance measurement by the odometer 21, the correction measurement values, which are formed by determining the difference between desired and actual values, are stored with reference to the particular location.

FIG. 4 shows the situation at the end of the measuring cycle, when the mobile measuring vehicle 1 has reached the stationary measuring vehicle 2 in the course of the surveying operation. By moving the stationary measuring vehicle 2 forward again in the direction of arrow 12, as shown in FIG. 5, the next measuring cycle is initiated.

While the invention has been illustrated and described as embodied in a method of surveying a track, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A method of surveying a track, comprising the steps of:
a) positioning a mobile measuring vehicle and a stationary measuring vehicle at end points of a track section to be measured during a measuring cycle, the mobile measuring vehicle being designed for mobility along a reference line in the form of an optical measuring beam between an emitter mounted on the stationary measuring vehicle and a receiving unit mounted on the mobile measuring vehicle and supported by flanged rollers on the track section;
b) determining, at the start of each measuring cycle, position coordinates of the emitter mounted on the stationary measuring vehicle, with the aid of a GPS receiver mounted thereon, relative to a fixedly installed GPS reference station located adjacent the track section to be measured, the coordinates of the GPS reference station being known within a terrestrial coordinate system;
c) aligning the reference line with the mobile measuring vehicle on the basis of the position data determined with the aid of the GPS receiver mounted on the stationary measuring vehicle; and
d) registering as a correction measurement value a change in position of the receiving unit relative to the reference line in dependence on an actual track position of the receiving unit transmitted by the flanged towards the stationary measuring vehicle to survey the track, without the aid of the GPS receiver.

2. The method of claim 1, and further comprising the step of measuring a distance traveled by the mobile measuring vehicle by an odometer.

* * * * *

UNITED STATES PATENT AND TRADEMARK OFFICE
CERTIFICATE OF CORRECTION

PATENT NO. : 7,050,926 B2  
APPLICATION NO. : 09/501251  
DATED : May 23, 2006  
INVENTOR(S) : Josef Theurer and Bernhard Lichtberger Page 1 of 1

It is certified that error appears in the above-identified patent and that said Letters Patent is hereby corrected as shown below:

Column 6, line 13:

Add after "flanged" --rollers, as the mobile measuring vehicle advances in the direction--

Signed and Sealed this

Fifteenth Day of August, 2006

JON W. DUDAS  
*Director of the United States Patent and Trademark Office*